United States Patent
Wexler

(10) Patent No.: US 9,633,119 B2
(45) Date of Patent: Apr. 25, 2017

(54) CONTENT RANKING BASED ON USER FEATURES IN CONTENT

(71) Applicant: Yahoo! Inc., Sunnyvale, CA (US)

(72) Inventor: Mike Wexler, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 214 days.

(21) Appl. No.: 14/147,789

(22) Filed: Jan. 6, 2014

(65) Prior Publication Data
US 2015/0193540 A1    Jul. 9, 2015

(51) Int. Cl.
*G06F 17/30*    (2006.01)

(52) U.S. Cl.
CPC ............... *G06F 17/30867* (2013.01)

(58) Field of Classification Search
CPC ................................ G06F 17/30867
See application file for complete search history.

(56) References Cited

U.S. PATENT DOCUMENTS

| | | | |
|---|---|---|---|
| 7,657,523 B2 | 2/2010 | Ebanks | |
| 8,126,882 B2 | 2/2012 | Lawyer | |
| 8,380,801 B2 | 2/2013 | Sherrets et al. | |
| 2008/0040474 A1* | 2/2008 | Zuckerberg | G06Q 30/02 709/224 |
| 2008/0209343 A1* | 8/2008 | Macadaan | G06F 3/0482 715/747 |
| 2013/0031034 A1* | 1/2013 | Gubin | G06Q 10/06393 706/12 |
| 2014/0052540 A1* | 2/2014 | Rajaram | G06Q 30/0255 705/14.66 |

\* cited by examiner

*Primary Examiner* — Etienne Leroux
*Assistant Examiner* — Cindy Nguyen
(74) *Attorney, Agent, or Firm* — Martine Penilla Group, LLP

(57) ABSTRACT

Methods, systems, and computer programs are presented for providing a personalized news stream to a user. One method includes an operation for identifying user features associated with a user. The user features include personal features and social features. The personal features are based on activities of the user and the profile of the user. The social features are based on information about social connections of the user. The method further includes operations for extracting content features from a corpus of content items, for identifying intersections between user features and content features, and for assigning weights to the content features from the corpus based on the identified intersections. A score for each content item is determined based on the content features and the respective weights of the content items. The content items are then ranked based on the scores. One or more of the ranked content items are displayed.

20 Claims, 8 Drawing Sheets

CONTENT RANKING BASED ON USER FEATURES IN CONTENT

BACKGROUND

1. Field of the Invention

The present embodiments relate to methods for providing news, and more particularly, methods, systems, and computer programs for providing a personalized news stream to a user.

2. Description of the Related Art

The Internet has witnessed an explosive growth of online news. In 2009, the number of people that got news from the web became larger than the number of people that get their news from newspapers. And the number of online-news readers keeps growing, due in part to the explosive growth of devices having web access. The number of people accessing online news has been steadily increasing over the past years, which shows the growing appeal of reading news online.

Different people like different types of news content. In order to provide a better news-reading experience, some news websites recommend different types of media to users based on past behavior. Personalized news aims at delivering a news stream to a user, according to the desires and use trends of the user. However, customizing the news stream is a complex problem because the number of news sources and the multiple types of available media continue to grow rapidly.

In some solutions, the content selection is based on preferences entered by the user, such as for example, a user that likes football and soccer. The result may be that the user gets a list of articles related to football, football, soccer, football, soccer, soccer, etc., without much variety and without inserting other items that may be of interest to the user.

Creating a personalized news-reading experience has become extremely important for internet news providers looking to maintain users' interest.

It is in this context that embodiments arise.

SUMMARY

Methods, devices, systems, and computer programs are presented for providing a personalized news stream to a user. It should be appreciated that the present embodiments can be implemented in numerous ways, such as a method, an apparatus, a system, a device, or a computer program on a computer readable medium. Several embodiments are described below.

In one embodiment, a method includes an operation for identifying user features associated with a user. The user features include personal features and social features, the personal features being based on activities of the user and based on a profile of the user, and the social features being based on information about social connections of the user. Further, the method includes operations for extracting content features from a plurality of content items, identifying intersections between user features and content features for the plurality of content items, and for assigning weights to the content features from the plurality of content items based on the identified intersections. Further, the method includes operations for determining scores for each content item based on the content features and respective weights of the content items, and for ranking the plurality of content items based on the scores. One or more of the ranked plurality of content items are then displayed for the user. In another embodiment, the operations of the method are executed by a processor.

In another embodiment, a method includes an operation for identifying personal features of interest to a user based on activities of the user and based on a user profile. In addition, the method includes operations for identifying social connections of the user, and for identifying social features for the social connections of the user. The social features are based on activities of the social connections and the user profiles of the social connections. In addition, the method includes operations for identifying user features by consolidating the personal features and the social features, extracting content features from a plurality of content items, identifying intersections between the user features and the content features for the plurality of content items, assigning weights to the content features from the plurality of content items based on the identified intersections, and for determining scores for each content item based on the content features and respective weights of the content items. The plurality of content items are ranked based on the scores, and one or more of the ranked plurality of content items are then displayed. In one embodiment, the operations of the method are executed by a processor.

In yet another embodiment, a non-transitory computer-readable storage medium, which stores a computer program, includes program instructions for identifying user features associated with a user. The user features include personal features and social features, where the personal features are based on activities of the user and based on a profile of the user, and the social features are based on information about social connections of the user. The storage medium further includes program instructions for extracting content features from a plurality of content items, program instructions for identifying intersections between user features and content features for the plurality of content items, and program instructions for assigning weights to the content features from the plurality of content items based on the identified intersections. Furthermore, the storage medium includes program instructions for determining scores for each content item based on the content features and respective weights of the content items, program instructions for ranking the plurality of content items based on the scores, and program instructions for displaying one or more of the ranked plurality of content items.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for providing a personalized news stream. It will be apparent, that the present embodiments may be practiced without some or all of these specific details. In other instances, well known process operations have not been described in detail in order not to unnecessarily obscure the present embodiments.

In some embodiments, relationships between the reader of a news article and features in the news article (e.g., author, publisher, names, etc.) are used to produce a personalized news stream. In some embodiments, a large variety of signals are utilized to predict the interestingness of an article based on the relationship the reader has with the author, or the publisher, or the subject, etc., of an article. The body of news items is ranked according to the relevance of these news items to the user.

Figure 1:
FIG. 1 shows a home page provided by an Internet news service, according to one embodiment.

FIG. 1 shows a home page provided by an Internet news service, according to one embodiment. In one embodiment, the online news page 102 includes a plurality of links 104, also referred to as tabs, each link being provided for the selection of a news topic. Examples of news topics include News, Sports, International, Finance, Food, Lifestyle, Technology, Travel, Shopping, Entertainment, etc. When the user selects one of the tabs, the news page displays the news articles related to the selected tab, except for the Home tab where the user is taken back to the news homepage.

The online news page 102 may also include a personalized news stream 112, an area for headline news or featured news 108, an advertisement area 110, etc. A personalized news stream includes a plurality of news items presented in a custom order for a user, where the custom order is based, at least, on user parameters. In addition, the sorting of the news item may be based on other factors, such as news item relevance, news item creation date, etc.

The user parameters used for sorting the personalized new streams may include one or more of user demographic data (e.g., gender, age, address, country, etc.), employment, interests, search history, news-reading history, user-configured topics of interest, hobbies, etc.

The personalized news stream 112 includes news items that may be of different types, such as news articles, videos, slideshows, tweets, blogs, photographs, etc. Embodiments presented herein automatically create a personalized news stream having items from different types. The embodiments describe methods for providing a personalized news stream based, at least, in a commonality between features of the user and features of the news items, or based in an affinity between users with common features and certain new items or types of news items (e.g., 18-30 year-old males in San Francisco Bay Area tend to like news items about the local football team, the San Francisco 49ers).

It is noted that the embodiment illustrated in FIG. 1 is exemplary. Other embodiments may utilize different webpage layouts, additional or fewer sections, present the sections in different order, utilize different news topics, etc. The embodiments illustrated in FIG. 1 should therefore not be interpreted to be exclusive or limiting, but rather exemplary or illustrative.

Figure 2:
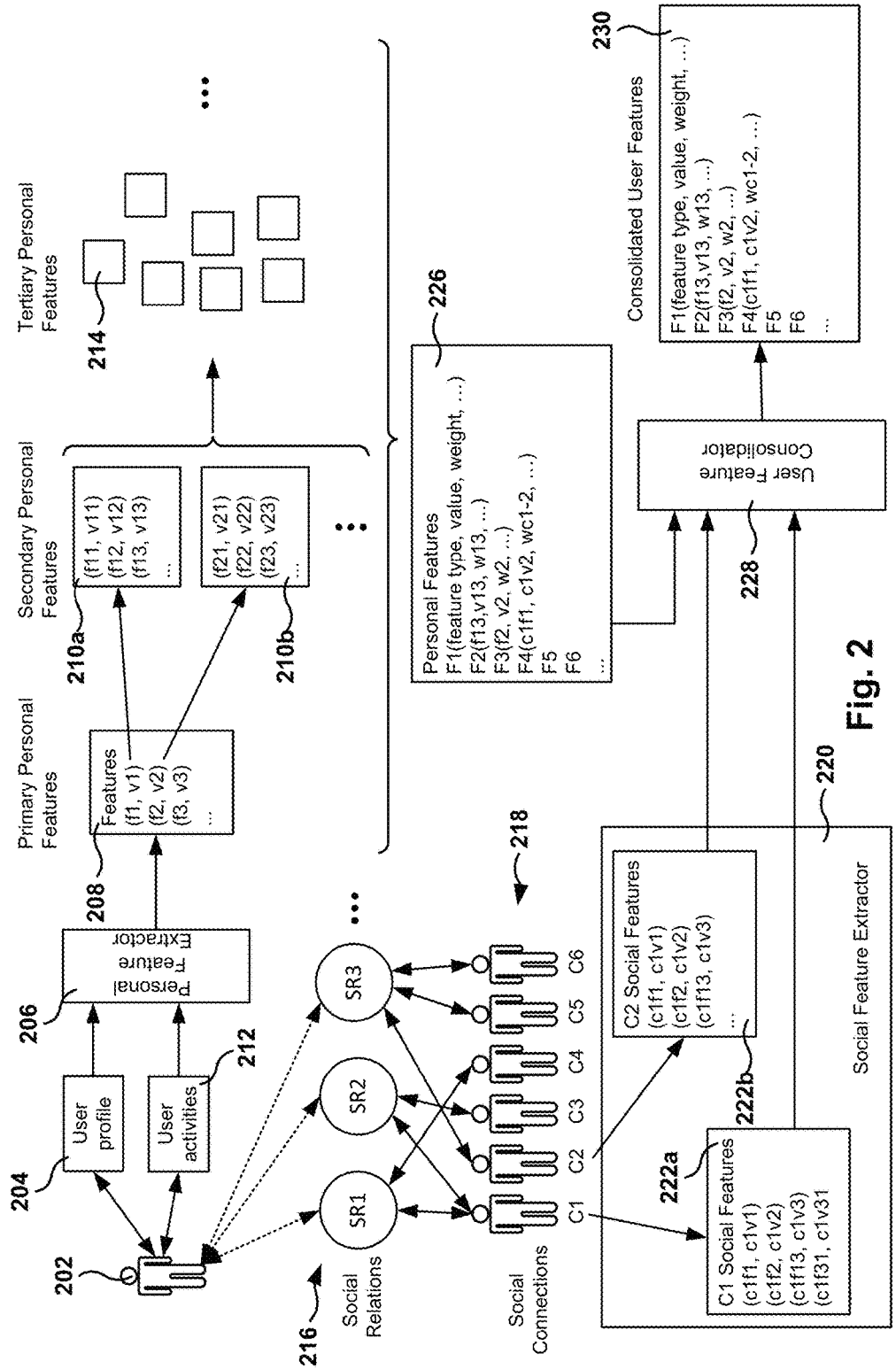
FIG. 2 illustrates the determination of consolidated user features based on user information and social information, according to one embodiment.

FIG. 2 illustrates the determination of consolidated user features based on user information and social information, according to one embodiment. Embodiments of the invention mine available sources of relationships between the reader and features in an article (e.g., people, or organizations, etc.). The closeness and type of relationship between the reader features and the article features are used to assist in the ranking of the article for presentation in a personalized news stream.

In one embodiment, user 202 has user profile 204 with information about the user. The profile includes user-related information, such as demographic data (e.g., age, gender, date of birth, birthplace, address, etc.), interests of the user (that the user may have entered in a social network or some other website), education history, favorite teams, etc. In addition, the user profile may include information about the activities of user 202, such as search history, shopping history, articles read in the past, favorite websites, travel history, etc.

In one embodiment, personal feature extractor 206 determines a list of personal features 208 associated with a profile of the user 204 and associated with activities of the user. Each identified personal feature includes a feature type and a feature value (e.g., $(f_1, v_1)$). For example, a feature may be "city of residence" and the value "San Francisco, Calif."

The features in the user profile 204 may change over time, and the personal feature extractor 206 periodically parses the user profile 204 to recalculate the personal features 208. As used herein, the personal features extracted from the user profile directly are referred to as primary personal features or first-level personal features. Secondary personal features, also referred to as second-level personal features, are those personal features derived from the primary personal features. Tertiary personal features are the features derived from the secondary personal features, etc.

The secondary personal features are derived from the primary personal features by finding information related to a pair (primary feature, feature value). For example, a primary personal feature may be "University" and the value may be "Santa Clara University." Secondary personal features may include (University City, Santa Clara), (University Founded, 1851), (Religious School, Catholic), (Historic Value, California Mission), (University Street, 500 El Camino Real), etc.

Similarly, the process may be repeated to obtain tertiary personal features 214, and so forth. However, as more levels of information are added, the information grows exponentially and the association to the user becomes weaker. In some embodiments, the features derived from the user profile, also referred to as personal profile features, are limited to one or two levels, but other embodiments may utilize other number of levels, such as three, or four, etc.

After the personal features of the different levels are calculated, a list of personal features 226 is created by consolidating the information from the different levels. In one embodiment, each feature is given a weight that identifies the degree by which the feature is linked to the user. For example, a tertiary personal feature will typically have a lower weight than a primary personal feature, as the primary personal feature will usually be more determinant in identifying what is of interest to the user.

Further, a feature may be found several times and at different levels, indicating a degree of a redundancy. This redundancy causes higher weights to these features that come up several times than the weights that would be given if the features are only found once. For example, a user may be a chess fanatic, and multiple signals related to chess may be found, such as clubs, books purchased, interest of the user, interest of friends of the user, etc.

The personal features also includes items of information derived from the activities of the user 212, such as shopping online, electronic communications, etc.

In addition to the user profile, embodiments presented herein determine social relations established by the user 202, and then the personal features associated with the social relations, also referred to as social connections, are also calculated for ranking news items.

The social relations 216 may be found in any of the following:

- social networks: to determine friends in the social network,
- professional networks: (e.g., linkedIn or professional associations) to identify coworkers or places where the user has worked,
- address book of the user: to identify people found in the address book,
- public records: to identify people that have public transactions with the user,
- electronic communication parties: to identify people that have exchanged emails, text messages, phone calls, etc., with the user,
- blogging platforms (e.g., Tumblr) to determine people the user follows, people following the user, blog posts that get liked or reflagged, etc.
- commercial transactions: to identify places or websites where the user has shopped, etc.

For description purposes, the social connections of the user 218 are referred to as people, but the social connections may also include organizations or any other entity that may be related to the user.

Once the social relations 216 have been identified, a social feature extractor 220 determines the social features associated with the social relations (e.g., 222a and 222b), in similar fashion to the process described above for determining the personal features of user 202.

User feature consolidator 228 examines the personal features 226 and the social features 222a, 222b to produce a consolidated user feature list 230. At this point, each of the features is given a weight that indicates the strength of the feature with respect to the interests of the user.

Users have access to different social networks, friends, work history, education history (the schools users went to, friends users made there, degrees, etc.), etc. The goal is to examine this information to identify features that may interest the user. For example, if the user has a friend that lives in Tulsa, Okla. If there is a news article about a tornado in Oklahoma, this article may be more interesting to the user that an article about a tornado in Kansas City, because the user has a friend that lives in Oklahoma. In another example, if a friend works for an investment bank, an article about the investment bank may be of interest to the user (e.g., if the investment bank announces layoffs).

The number of levels examined for identifying features, both when looking at the profile or the user activities, and when looking at the social connections, determines the complexity of creating a prioritized list of features. The higher the number of levels, the bigger the complexity. In one embodiment, some of the calculations for ranking a corpus of news items are performed in advance, so when the user accesses the news site, the prioritized personal list of articles can be generated quickly. For example, the personal features associated with the profile of the user are calculated in advance, in one embodiment.

Also, in some embodiments, the social connections of the user are determined in advance, as well as the social features related to those social connections. In one embodiment, the list of features is updated periodically (e.g., daily).

It is noted that the embodiments illustrated in FIG. 2 are exemplary. Other embodiments may utilize different number of levels, different features, different modules for deriving user features, etc. The embodiments illustrated in FIG. 2 should therefore not be interpreted to be exclusive or limiting, but rather exemplary or illustrative.

Figure 3:
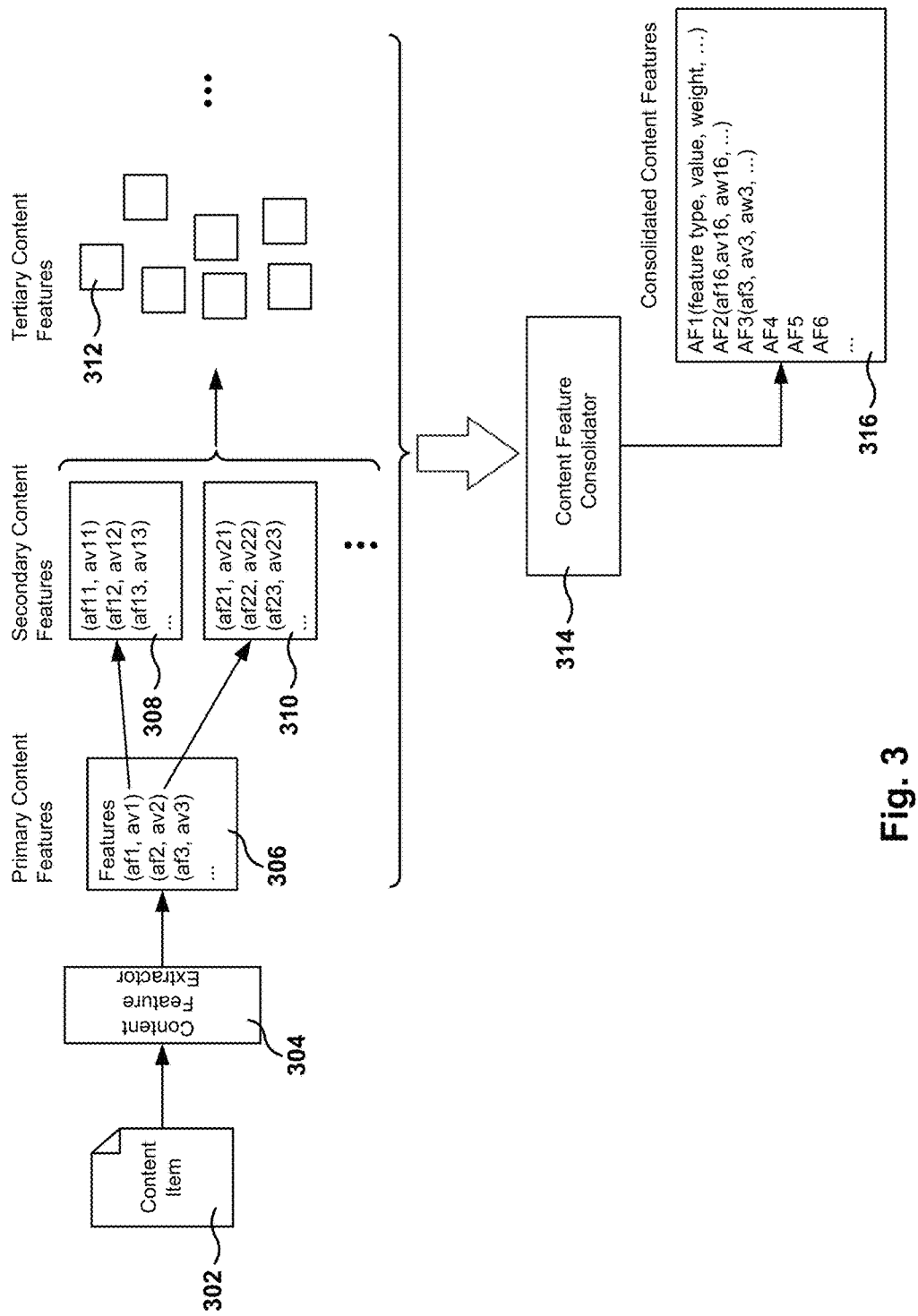
FIG. 3 illustrates the extraction of content features from a content item, according to one embodiment.

FIG. 3 illustrates the extraction of content features from a content item, according to one embodiment. Content feature extractor 304 analyzes a content item 302 to extract primary content features 306. As with personal features discussed above, the primary content features include a feature type and a feature value. For example, the content features extracted from a content item may include the author, the publisher, the people mentioned in the article, the name of the newspaper or media outlet, topic, cities or countries mentioned in the article, etc.

For description purposes, embodiments are presented regarding news articles presented on a website, but other types of media may also be included, such as photographs, slideshows, videos, etc. In one embodiment, the primary content features 306 are further analyzed to determine related information: secondary content features 308, 310, tertiary content features 312, etc.

In one example, a news article describes an important donation to university. If the user, or a relative of the user, attended this university, then this article may be of high interest to the user. Also, if one of the friends of the user is a professor at the university, then this fact will make the article more interesting to the user than if the user had no friends associated with the university.

Content feature consolidator 314 compiles all the features identified and creates a consolidated content feature list 316. The consolidated content features include, at least, the feature type, the value of the feature, and a weight associated therewith. The weight indicates the degree of relevance of the extracted feature within the content item 302.

Figure 4:
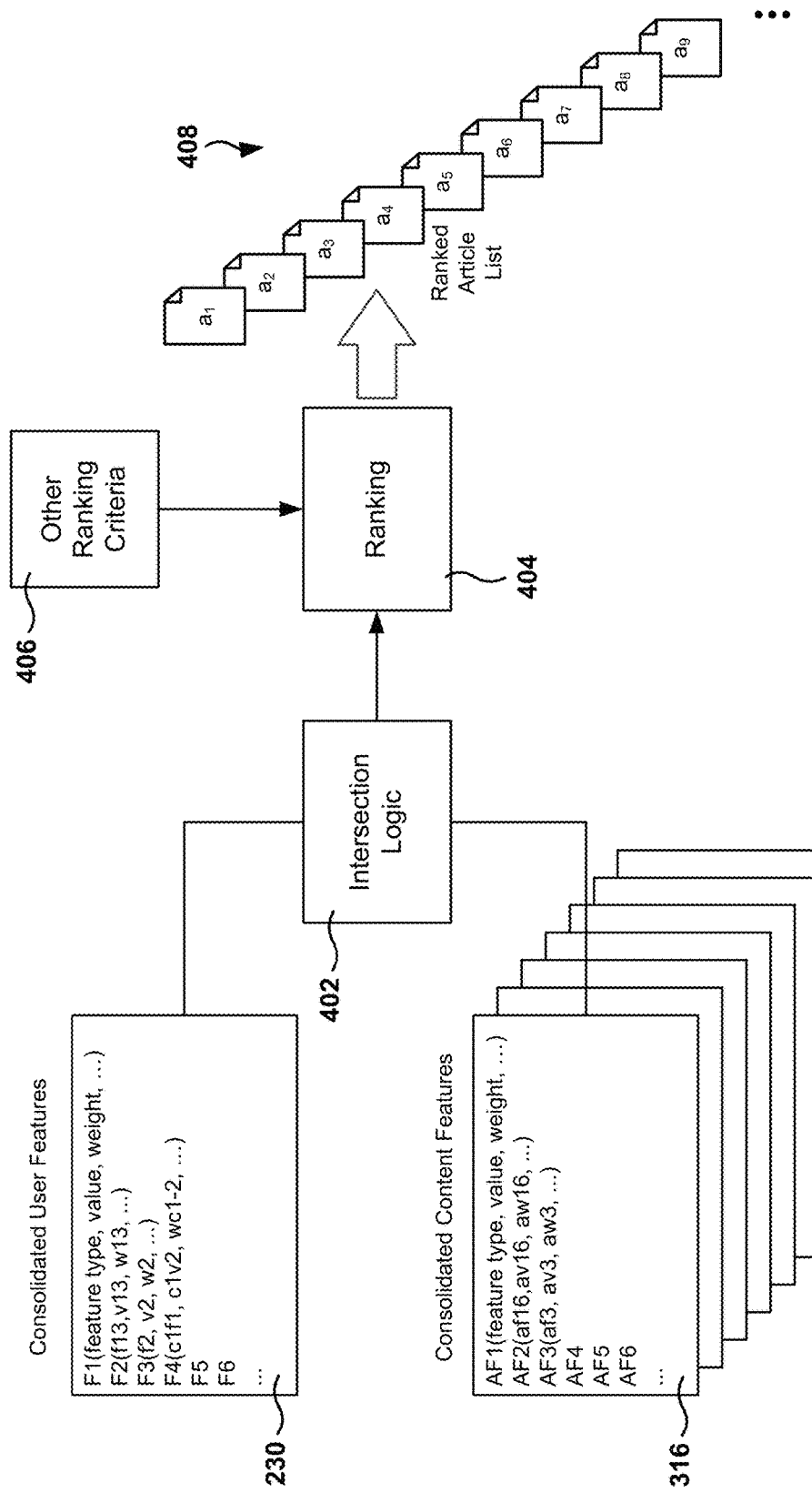
FIG. 4 illustrates the ranking of content items based on the consolidated user features and the consolidated content features, according to one embodiment.

FIG. 4 illustrates the ranking of content items based on the consolidated user features and based on the consolidated content features, according to one embodiment. Once the consolidated user features 230 and the consolidated content features 316 are determined, intersection logic 402 analyzes the commonality between the consolidated user features and the consolidated content features in order to identify features common in both sets.

The commonality found by intersection logic 402 is used by ranking logic 404 to generate a prioritized list of articles 408, also referred to as ranked list of articles. This list of articles 408 reflects that the ranking has been performed taking into consideration the personal features of the user on their relationship to news article features.

It is noted that ranking logic 404 may also use other ranking criteria 406 to determine the final list of articles 408. For example, other criteria that may be used for ranking include the popularity of the news item among news readers, the date when the article was created, the credibility of the news source, the publisher of the news item, etc.

In one embodiment, intersection logic 402 finds the intersection between the personal features associated with the user, and the article features. The features found in this intersection are given a higher weight when ranking the news corpus than if the features were not found in the intersection.

By using features that are associated with both the user and a content item, additional personalization is provided when delivering a news stream. For example, even though the user may not like hockey, an article about hockey may show up if a friend is playing in a hockey game mentioned in the article. In another example, a user may dislike hockey, but that article will be ranked high if the article describes that a friend from high school just won a gold medal in the Olympics playing hockey.

In one embodiment, intersection logic 402 does a comparison of the features in consolidated user features 230 and consolidated content features 316. This includes checking for overlaps in feature types and their respective values.

In another embodiment, the intersection logic 402 compares all values found in consolidated user features 230 and consolidated content features 316, irrespective of their feature type. This means, that the intersection logic is based on keyword matching. In general, any type of logic that identifies the commonality between the user features and the article features may be used.

In one embodiment, the matches obtained by intersection logic 402 are assigned a weight that provides a numerical value regarding the importance of each feature match when ranking content. In one embodiment, machine learning techniques are used to determine the weights of the matches found, which may be learned and tuned over time, both in relationship to each other and in relationship to other features used in content ranking.

In one embodiment, Gradient Boosted Decision Tree (GBDT) is used for machine learning the value of weights for features found when matching user features and article features. GBDT is a machine learning technique for regression problems, which produces a prediction model in the form of an ensemble of weak prediction models, typically decision trees. GBDT builds the model in stages and uses optimization of an arbitrary differentiable loss function. The gradient boosting method can also be used for classification problems by reducing them to regression with a suitable loss function. More details regarding machine learning are provided below with reference to FIG. 5.

The value of the weights may change over time if more information becomes available regarding the quality of the ranking process. The quality of the results, when performing searches and showing the results to users, may be measured in different ways, such as by click-through rates, dwell times, user sharing articles, how far the user goes through a list of results before clicking on an article, etc.

In one embodiment, the score and an article is measured according to the following formula:

$$S = a \cdot x + b \cdot y + c \cdot z + \ldots$$

Where S is the score for the article; a, b, and c are weights; and z, y, and z are features found in the article used to measure the value of the article to a user.

Further, by identifying the weights of the different features, machine learning methods allow the system to score new articles that do not have a use history because the articles are new. Therefore, recently-created articles may be shown to a user where the recently-created articles may be of relevance to the profile or social network of the user.

The embodiments described above may be used when showing news content to users, but the same principles may be used in other areas, such as by selecting advertisement for users, doing Internet searches, finding friends for a user, etc.

For example, if the social connections of the user identify friends residing in Boston, the user may be presented with ads for flights to Boston.

It is noted that the embodiments illustrated in FIG. 4 are exemplary. Other embodiments may utilize different methods for correlating user and content features, use different modules, combine the functionality of several modules into one, etc. The embodiments illustrated in FIG. 4 should therefore not be interpreted to be exclusive or limiting, but rather exemplary or illustrative.

Figure 5:
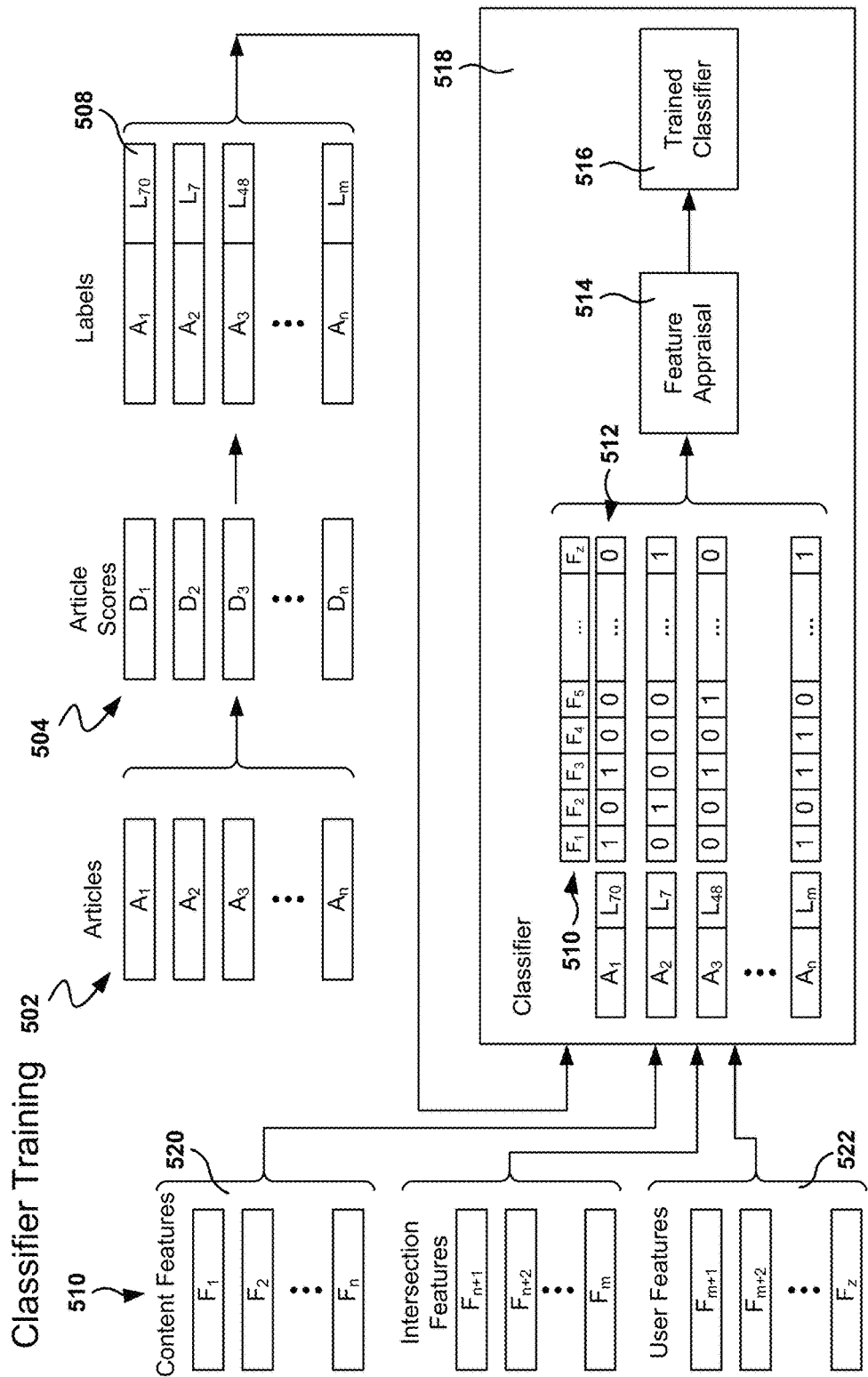
FIG. 5 illustrates a method for training a classifier, according to one embodiment.

FIG. 5 illustrates a method for training a classifier for ranking news articles, according to one embodiment. In one embodiment, the classifier is a computer program that determines one or more ranking parameters for prioritizing news articles in a news stream. The classifier utilizes machine learning and relevance models to determine the one or more ranking parameters. In one embodiment, the classifier is a logistic regression classifier, but other type of classifiers may also be used.

Machine learning for search engines requires a rather straightforward approach because search results tend to be valuable or not, independently on the identity of the user that is searching. However with news, the straightforward approach does not work because different users, with different tastes and interests, are interested in different types of news articles.

To train the classifier, a plurality of article scores $D_i$-$D_n$ 504 (e.g., dwell times, click-through rates, or a combination thereof, etc.) are calculated for a plurality of articles 502 $A_1$-$A_n$. Next, a plurality of labels L, 508 is calculated for the plurality of articles $A_i$ 502. In one embodiment, the labels are created based on article scores $D_i$-$D_n$ 504.

In one embodiment, a plurality of features 510 $F_1$-$F_z$ are defined and input into classifier 518. The features 510 include content features 520 related to article content, features 522 related to user characteristics, and features related to intersections between content features and user features. Each feature 510 $F_i$, when found, increases the value of the article to the user.

Each feature $F_i$ may have a different impact on the calculation of the probability, and during the training phase the classifier determines the relative importance for each of the features. Anything can be a feature for the classifier, e.g., articles read, names in the article, features in the article, organizations in the article, titles, user interests, user browsing history, etc.

For example, one of the article features may be defined as a date in the article. Another feature may be that a date towards the beginning of the article is within the last 48 hours. For example, a recent day in the article is a good indicator that the article is recent news, which means that the article will probably be more relevant that an older article. Other article features may be selected from the following group:

- The article contains a date or a date reference (e.g., a date—Nov. 7, 2011, or January 2011; relative date—last month, Yesterday; name of a month—February; a year—2007; a day of the week—Monday; etc.)
- The article contains a time related word or a word for measuring time (e.g., ago, days, weeks, months, years, etc.)
- The article has capitalized words in the middle of the sentence (e.g., President Obama, John Lennon, Congress)
- The article includes sentences in the past tense (e.g., the victim was last seen when leaving the supermarket)
- One or more verbs refer to an action (e.g., drove, died)

The article contains a proper name (e.g. Michael, The Beatles)

The article contains the name of a celebrity (e.g., Lady Gaga, Elton John, Michael Jordan)

The article contains the name of a media outlet (e.g., NBC, CNN, NY Times, Reuters, etc.)

The article contains words indicative of telling a story (e.g., reported, according to, said, announced, indicated, explained, etc.)

The article contains words often found in news reports (e.g., accident, car crash, police, lawyer, divorce, press conference, announcement, dollars, stock market, recession, etc.)

The article contains the name of a crime or a word related to a crime (e.g., kill, kidnap, assault, robbery, lawyer, bounty, dead, death, injured, hospital, charged, arrested, drunk, etc.)

The article contains a title (e.g., President, CEO, Coach, Principal, Doctor, etc.)

As a user accesses the news stream, the user accesses items of different types, such as news articles, videos, slideshows, etc. Over time, the activity of the user is tracked by the system in order to create a profile that assists the news stream personalization module to deliver news items to the user that are most likely to be of interest to the user. The items in the new stream are sorted according to the perceived value of the item for the user. The goal is to recommend items within the news stream according to the perceived value for the user.

In one embodiment, as an individual interacts with a software application, e.g., an instant messenger or electronic mail application, descriptive content may be identified. The descriptive content may be in the form of signals or stored physical states within memory, such as, for example, an email address, instant messenger identifier, phone number, postal address, message content, date, time, etc. The descriptive content may be stored, typically, along with contextual content. For example, how a phone number came to be identified (e.g., the phone number was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

A profile builder may initiate generation of a profile for users of an application, including search engine users, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of news streams or search results, such as with respect to a particular user.

The article scores contribute to the determination of what kind of news the user wants. For example, if the score is based on dwell time, and a user spends watching sports news 10% more time than when watching other types of content, the dwell time is used to determine an interest of the user in sports.

In one embodiment, user features 522 may be selected from the following group:

Age
Gender
Address
Click history
News read
Frequency of articles read for each news category
Searches
Dwell times for articles read
User interests defined on a social network
Social relationships of user
Occupation
Education The list of features recited above is exemplary, and other embodiments may utilize different features, or a subset of these features. The feature list should therefore not be interpreted to be exclusive or limiting, but rather exemplary or illustrative.

The features 510, the articles 502, and the labels 508 are input to the classifier 518. For each article, the classifier determines if each of the features is present (which is represented in FIG. 5 as a logical value of 1 when a feature is present, and a value of 0 when the feature is missing).

In the feature appraisal phase, the classifier utilizes machine learning algorithms to compare the presence of each of the features in the article or the user characteristics with the scores of the article. The result of the feature appraisal is a trained classifier, which includes an assessment of the value of each of the features $F_1$-$F_m$ for predicting if an article will be of interest to a particular user. In addition, the trained classifier also evaluates the importance of finding combinations of features within an article.

Different Machine Learned Ranking (MLR) models rankers can be used for classifying news. For example, the classifier may be one of (1) RankNet (C. J. C. Burges, T. Shaked, E. Renshaw, A. Lazier, M. Deeds, N. Hamilton and G. Hullender, "Learning to rank using gradient descent", August 2005); (2) RankBoost (Y. Freund, R. Iyer, R. Schapire, and Y. Singer, "An efficient boosting algorithm for combining preferences", 2003); (3) AdaRank (J. Xu and H. Li. AdaRank, "A boosting algorithm for information retrieval", 2007); (4) linear feature-based models for ranking (D. Metzler and W. B. Croft, "Linear feature-based models for information retrieval", 2006); (5) GBDT (J. H. Friedman. "Greedy function approximation, A gradient boosting machine", 2001); (6) ListNet (Z. Cao, T. Qin, T. Y. Liu, M. F. Tsai, and H. Li, "Learning to Rank: From Pairwise Approach to Listwise Approach", 2007), all of which are incorporated by reference herein.

Figure 6:
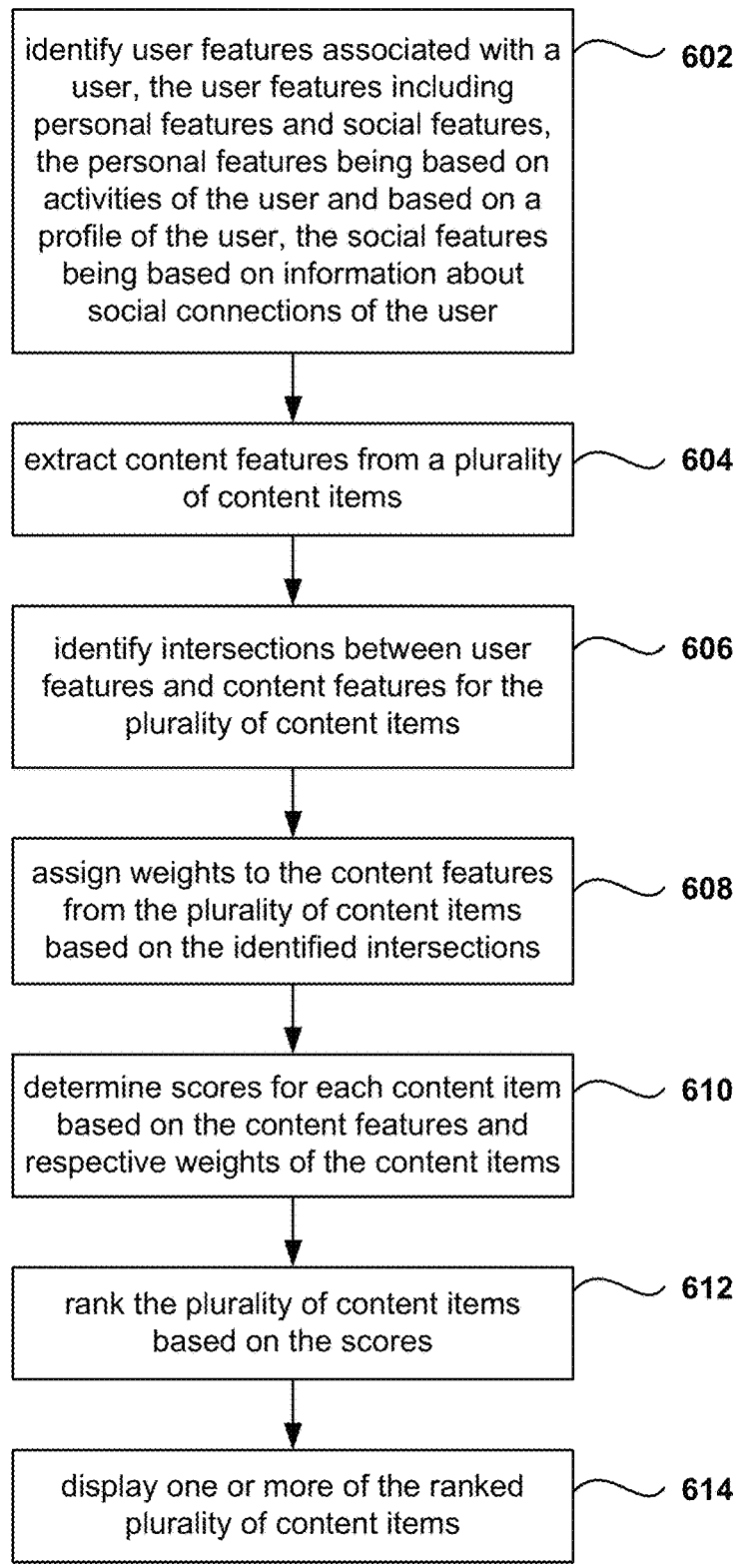
FIG. 6 is a flowchart illustrating an algorithm for providing a personalized news stream, in accordance with one embodiment.

FIG. 6 is a flowchart illustrating an algorithm for providing a personalized news stream, in accordance with one embodiment. In operation 602, the method identifies user features associated with a user. The user features include personal features and social features, where the personal features are based on activities of the user and based on a profile of the user, and the social features are based on information about social connections of the user.

From operation 602, the method flows to operation 604 where content features are extracted from a plurality of content items. From operation 604 the method flows to operation 606, where the method identifies intersections between user features and content features for the plurality of content items.

From operation 606, the method flows to operation 608 where weights are assigned to the content features from the plurality of content items based on the identified intersections. In operation 610 the scores are determined for each content item based on the content features and the respective weights of the content items.

From operation 610, the method flows to operation 612 where the plurality of content items are ranked based on the scores. From operation 612, the method flows to operation 614 where one or more of the ranked plurality of content items is displayed.

Figure 7:
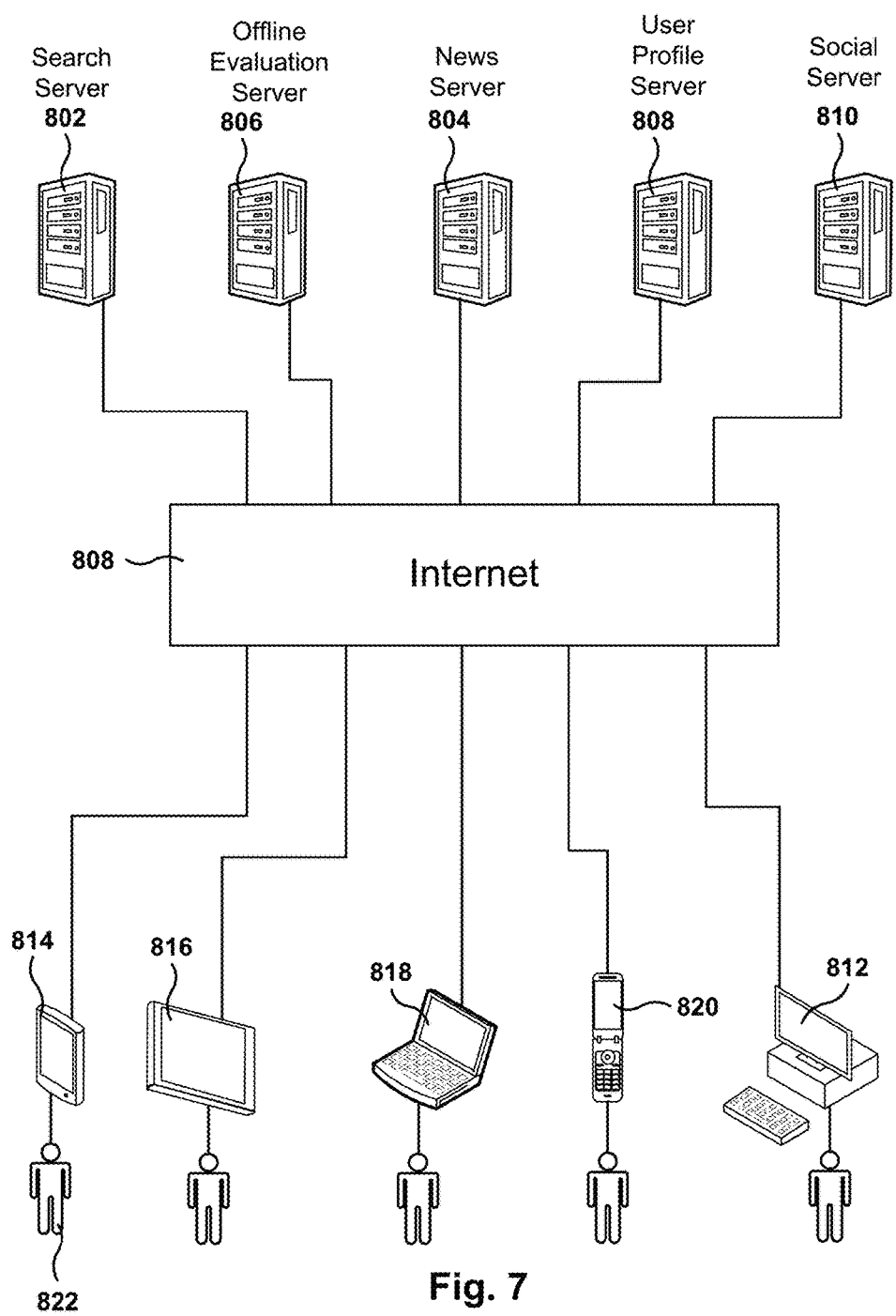
FIG. 7 is a simplified schematic diagram of a computer system for implementing embodiments of the present disclosure.

FIG. 7 is a simplified schematic diagram of a computer system for implementing embodiments of the present disclosure. Internet 808 is used to interconnect users with servers. Users 822 access Internet 808 via a variety of devices, such as smart phone 814, tablet 816, laptop 818, mobile phone 820, personal computer 812, etc. These are merely examples, and any other device used to access Internet 808 can be used to implement embodiments of this disclosure. For example, the devices may be wired or wireless. In one embodiment, a browser is executed on a device, and the graphical user interface is presented on a display. The browser provides the functionality for accessing the Internet.

Search server 802, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 804 provides news to users. One example of a news server is Yahoo!® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

Offline Evaluation server 806 evaluates offline datasets for training MLR ranking models. Offline Evaluation server 806 may utilize information from news server 804, search server 802, social server 810, etc. Social Server 810 provides social network services to Internet users.

User Profile Server 808 builds user profiles for users utilizing new services. The profiles are based on user activity and user characteristics, but other factors may also be considered.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 8:
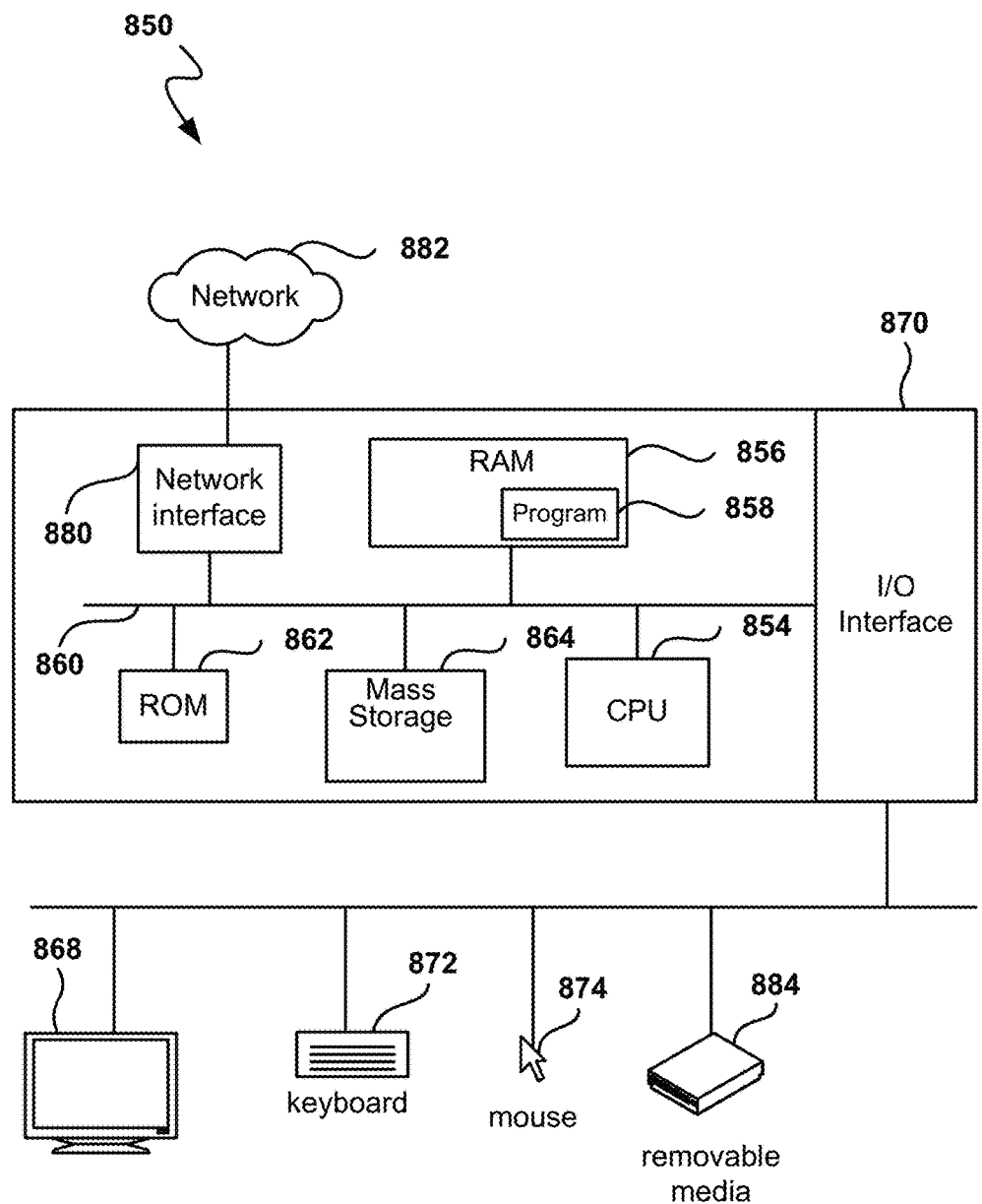
FIG. 8 is a simplified schematic diagram of a computer system for implementing embodiments of the present disclosure.

FIG. 8 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1104, which is coupled through bus 1110 to random access memory (RAM) 1106, read-only memory (ROM) 1112, and mass storage device 1114. Computer program 1108 for searching relevant news articles resides in random access memory (RAM) 1106, but can also reside in mass storage 1114.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120. The embodiments can also be practiced in distributed computing environments where tasks are performed by remote processing devices that are linked through a wire-based or wireless network.

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
    identifying personal features associated with a user, the personal features being based on activities of the user and based on a profile of the user;
    identifying social features of social connections of the user, the social features being based on activities of the social connections of the user and based on user profiles of the social connections of the user;
    consolidating the personal features and the social features to create user features;
    assigning weights to the user features based on a strength of the user features with respect to user interest;
    extracting content features from a plurality of content items;
    assigning weights to the content features based on a degree of relevance of the content features to the content items;
    identifying, by an intersection logic, intersections between the user features and the content features for the plurality of content items, wherein the intersection logic analyzes a commonality between the user features and the content features;
    adjusting the weights of the content features from the plurality of content items based on the intersections, wherein the weights of the content features found in the intersections are increased relative to the weights of the content features not found in the intersections;
    determining scores for each content item based on the content features and the weights of the content features;
    ranking the plurality of content items based on the scores;
    displaying one or more of the ranked plurality of content items, wherein operations of the method are executed by a processor.

2. The method as recited in claim 1, further including:
    determining the social connections of the user based on friends of the user in one or more social networks, people in an address book of the user, and people exchanging electronic communications with the user.

3. The method as recited in claim 1, wherein identifying the personal features further includes:
    identifying first-level personal features found in the profile or in the activities of the user; and
    identifying second-level personal features that are derived from the first-level personal features.

4. The method as recited in claim 1, wherein the identifying by the intersection logic, intersections further includes:
    determining if any of the user features is present in any of the content items with a same value.

5. The method as recited in claim 1, wherein the ranking is performed with a classifier trained with machine learning.

6. The method as recited in claim 1, wherein the activities of the user include one or more of electronic message exchanges, or search history, or shopping history, or navigation history.

7. The method as recited in claim 1, wherein the user profile includes one or more of demographic information, or birth place, or work history, or study history, or residence history, or identified interests of the user.

8. The method as recited in claim 1, wherein the content features include people mentioned in the content, geographic locations in the content, topic of the content, and geographic scope of the content.

9. The method as recited in claim 1, wherein the content items are news articles.

10. The method as recited in claim 1, wherein the displaying further includes:
    identifying content items that are ranked above a predetermined ranking threshold; and
    displaying the identified content items.

11. The method as recited in claim 1, wherein a first social feature includes a name of a city and a first content item includes a first content feature having the name of the city, wherein the score of the first content item is increased in response to the intersection based on the name of the city.

12. A method comprising:
    identifying personal features of interest to a user based on activities of the user and based on a user profile;
    identifying social connections of the user;
    identifying social features of social connections of the user, the social features being based on activities of the social connections of the user and based on user profiles of the social connections;
    identifying user features by consolidating the personal features and the social features;
    extracting content features from a plurality of content items;
    identifying intersections between the user features and the content features for the plurality of content items, wherein an intersection is identified between a social feature and one of the content items even if the social feature is not one of the personal features;
    assigning weights to the content features from the plurality of content items based on the intersections, wherein a first social feature includes a name of a city and a first content item includes a first content feature having the name of the city, wherein the weight of the first content item is increased in response to the intersection based on the name of the city;
    determining scores for each content item based on the content features and the weights of the content;
    ranking the plurality of content items based on the scores; and
    displaying one or more of the ranked plurality of content items, wherein content items of interest to the social connections are displayed for the user even if the content items are not identified as being of interest to the user, wherein operations of the method are executed by a processor.

13. The method as recited in claim 12, wherein identifying intersections further includes:
   determining common feature types present in the user features and in the content features of each content item; and
   determining if values associated with the determined feature types are equal in the user features and in the content features.

14. The method as recited in claim 12, further including:
   determining the social connections of the user based on friends of the user in one or more social networks, people in an address book of the user, and people exchanging electronic communications with the user.

15. The method as recited in claim 14, wherein identifying the social features further includes:
   identifying first-level social features found in the profile or in the activities of the social connections of the user; and
   identifying second-level social features that are based on the first-level social features.

16. The method as recited in claim 12, wherein operations of the method are performed by a computer program when executed by one or more processors, the computer program being embedded in a non-transitory computer-readable storage medium.

17. A non-transitory computer-readable storage medium storing a computer program, the computer-readable storage medium comprising:
   program instructions for identifying personal features associated with a user, the personal features being based on activities of the user and based on a profile of the user;
   program instructions for identifying social features of social connections of the user, the social features being based on the activities of the social connections of the user and based on the profiles of the social connections of the user;
   program instructions for consolidating the personal features and the social features to create user features;
   program instructions for assigning weights to the user features based on a strength of the user feature with respect to user interest;
   program instructions for extracting content features from a plurality of content items;
   program instructions for assigning weights to the content features based on a degree of relevance of the content features to the content items;
   program instructions for identifying, by an intersection logic, intersections between the user features and the content features for the plurality of content items, wherein the intersection logic analyzes a commonality between the user features and the content features;
   program instructions for adjusting the weights of the content features from the plurality of content items based on the intersections, wherein the weights of the content features found in the intersections are increased relative to the weights of the content features not found in the intersections;
   program instructions for determining scores for each content item based on the content features and the weights of the content features;
   program instructions for ranking the plurality of content items based on the scores; and
   program instructions for displaying one or more of the ranked plurality of content items.

18. The non-transitory computer-readable storage medium as recited in claim 17, wherein identifying the user features further includes:
   identifying first-level personal features found in the profile or in the activities of the user; and
   identifying second-level personal features that are based on the first-level personal features.

19. The non-transitory computer-readable storage medium as recited in claim 17, wherein extracting the content features further includes:
   extracting content features for each of the content items; and
   consolidating the content features found in all the content items.

20. The non-transitory computer-readable storage medium as recited in claim 17, wherein the activities of the user include one or more of electronic message exchanges, or search history, or shopping history, or navigation history.

* * * * *